INVENTOR.
ALVIE E. KELLEY
BY William D. Carothers
HIS ATTORNEY.

April 19, 1955 A. E. KELLEY 2,706,426

APPARATUS FOR REPEATEDLY REPRODUCING THREE-DIMENSIONAL DESIGNS

Filed Sept. 14, 1948 4 Sheets-Sheet 2

INVENTOR.
ALVIE E. KELLEY
BY William D. Carothers
HIS ATTORNEY.

INVENTOR.
ALVIE E. KELLEY
BY William D. Carothers
HIS ATTORNEY.

April 19, 1955

A. E. KELLEY 2,706,426

APPARATUS FOR REPEATEDLY REPRODUCING THREE-DIMENSIONAL DESIGNS

Filed Sept. 14, 1948

4 Sheets-Sheet 4

INVENTOR.

ALVIE E. KELLEY

BY William D. Carothers

HIS ATTORNEY.

United States Patent Office 2,706,426

Patented Apr. 19, 1955

2,706,426

APPARATUS FOR REPEATEDLY REPRODUCING THREE-DIMENSIONAL DESIGNS

Alvie E. Kelley, Washington, Pa., assignor to Kelley Industries, Inc., Eightyfour, Pa., a corporation of Pennsylvania Application September 14, 1948, Serial No. 49,246

11 Claims. (Cl. 82—19)

This invention relates generally to method and apparatus for forming varied shapes on machine tools such as lathes and more particularly to a machine tool attachment which will progressively scan the design on a revolving model by a combined transverse and axial motion that is employed to cut a recording of the design on the revolving surface of a record which in turn may be progressively scanned repeatedly to reproduce the design on other objects.

This invention may be used on different types of machine tools but is particularly adaptable as an attachment on a lathe, which type of machine tool has been selected for the purpose of disclosing this invention.

This invention is an improvement on the invention disclosed in United States Letters Patent No. 2,192,267, issued to me on March 5, 1940, and entitled "Lathe for Turning Special Shapes." The invention disclosed in said Letters Patent employs a record having a single continuous track in the face or on the perimeter of a disk and produces shapes known as two-dimensional shapes. The contour of this continuous track lies in a single plane and is enabled, through a compensator and the control of the relative speeds of the record and workpiece, to reduce or magnify a symmetrical design on the workpiece. The design of the track on the record may represent a general characteristic of the design that may be repeated one or more times about the axis of the workpiece or article being cut.

The present invention contemplates the cutting of a recording on a record from a model having a three-dimensional design on the surface thereof which design may depict characters or pictures or both in any irregular form. The recording is cut by a combined transverse and axial contact scanning motion on the surface of a record which may be cylindrical in form or disk type, and the design thereon may be in the same or different proportions to that of the actual design on the model. The record may then be rotated and the recording on the revolving surface is scanned to produce a combined transverse and axial motion which is employed to control a cutting tool for the purpose of reproducing the recording into a design on the surface of a workpiece. The ultimate design on the workpiece may be of the same or in different proportions than that of the recording or of the original design on the model. Such a reproduction may be made on any number of workpieces from the recording on the record or even repeated on a single workpiece and thereby enable one to repeatedly reproduce different workpieces with an unvaried design.

This invention is particularly adaptable for making plungers and molds for use on press and blow type glass machines or for other types of machines of similar character.

In making up molds for producing glassware on glass machines irregular designs have to be cut manually in the molds and on the plungers and it is impossible for a highly skilled artisan to reproduce a series of molds having exactly the same design. Such work not only requires a considerable length of time to produce a set of molds for a machine but also is very expensive.

The present invention contemplates the production of any number of molds having exactly the same design in a relatively short time and for a relatively low cost as compared to that of the manual process.

In producing a recording on a record by the method and apparatus of this disclosure one is enabled to make a recording of a single design on the record and repeatedly reproduce the same design about the circumference of a workpiece by controlling the relative rotation of the workpiece and the record, and by controlling the proportions of the transverse and axial scanning and cutting movements in forming the design on a workpiece.

Another important object of this invention is method and apparatus for recording a three-dimensional design on a revolving record which is greater in diameter and of greater length and greater depth than the pattern of the design on the model from which it is taken. By so changing the proportions of the length and the depth of the design recording and the width, which is represented by the circumference of the recording, together with the relative rotation of the model and record, one is enabled to materially magnify the recording and thereby minimize any errors or defects originally occurring on the model, or to correct such defects on the record. When employing a magnified recording to reproduce designs on workpieces smaller or larger than the original model or in repeatedly producing the recorded design around the circumference of a workpiece, the flaws or inaccuracies are reduced to a minimum and repeated reproductions can be made so long as the contact scanner of the recording does not wear or otherwise injure the surface of the recording.

Other objects and advantages appear hereinafter in the following description and claims.

The accompanying drawings show, for the purpose of exemplification, without limiting the invention or claims thereto, certain practical embodiments of this invention wherein:

Figures 1, 5, 6:
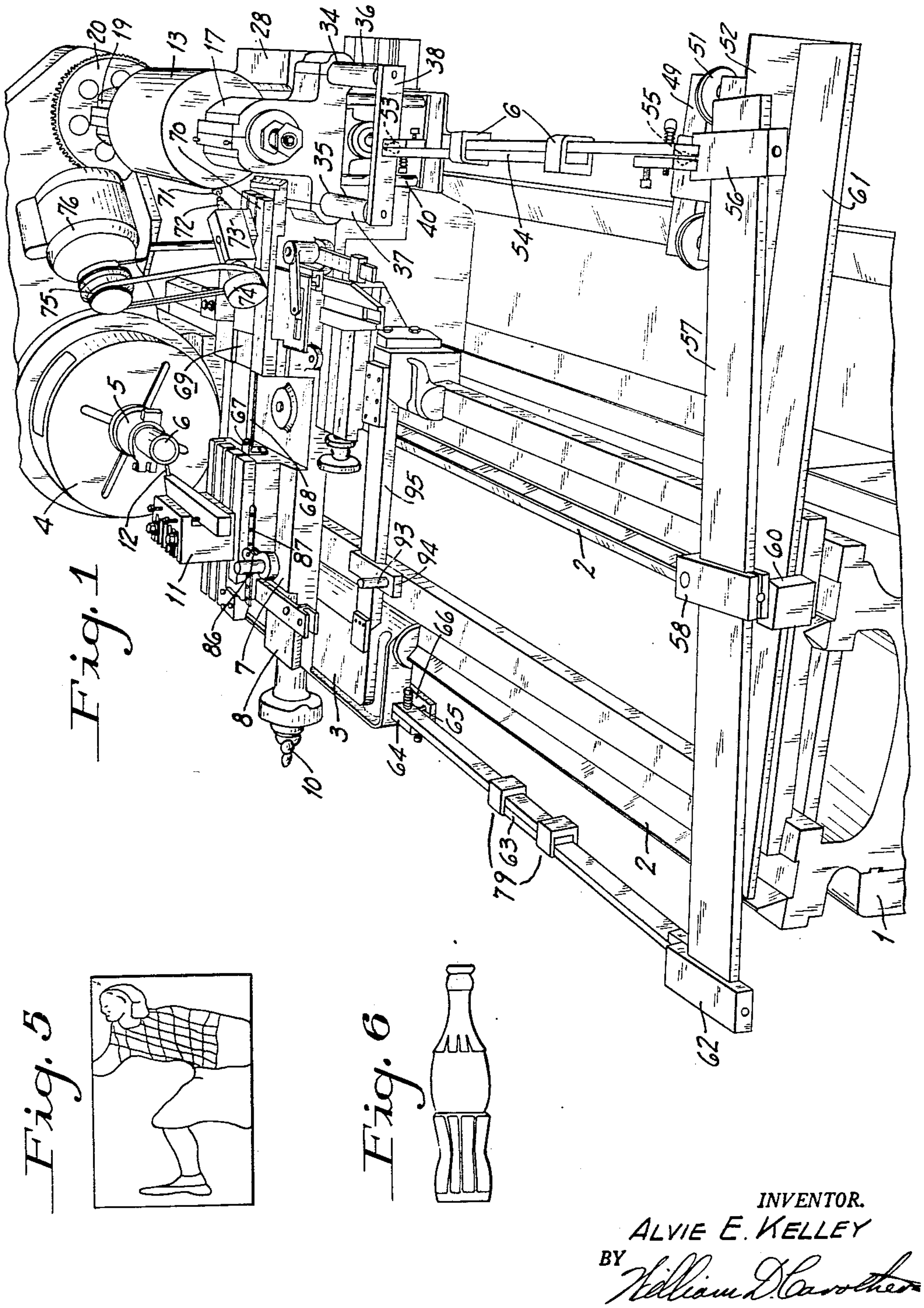
Fig. 1 is a perspective view of a lathe with parts broken away and showing the attachment comprising this invention set up to cut a recording on a cylindrical record being reproduced from the design on the cylindrical surface of a model.
Fig. 5 is an enlarged view in elevation of a cylindrical record of the type illustrated in Fig. 1.
Fig. 6 is an enlarged view in elevation of a shaped record for use on the attachment as illustrated in Fig. 2.
Figure 2:
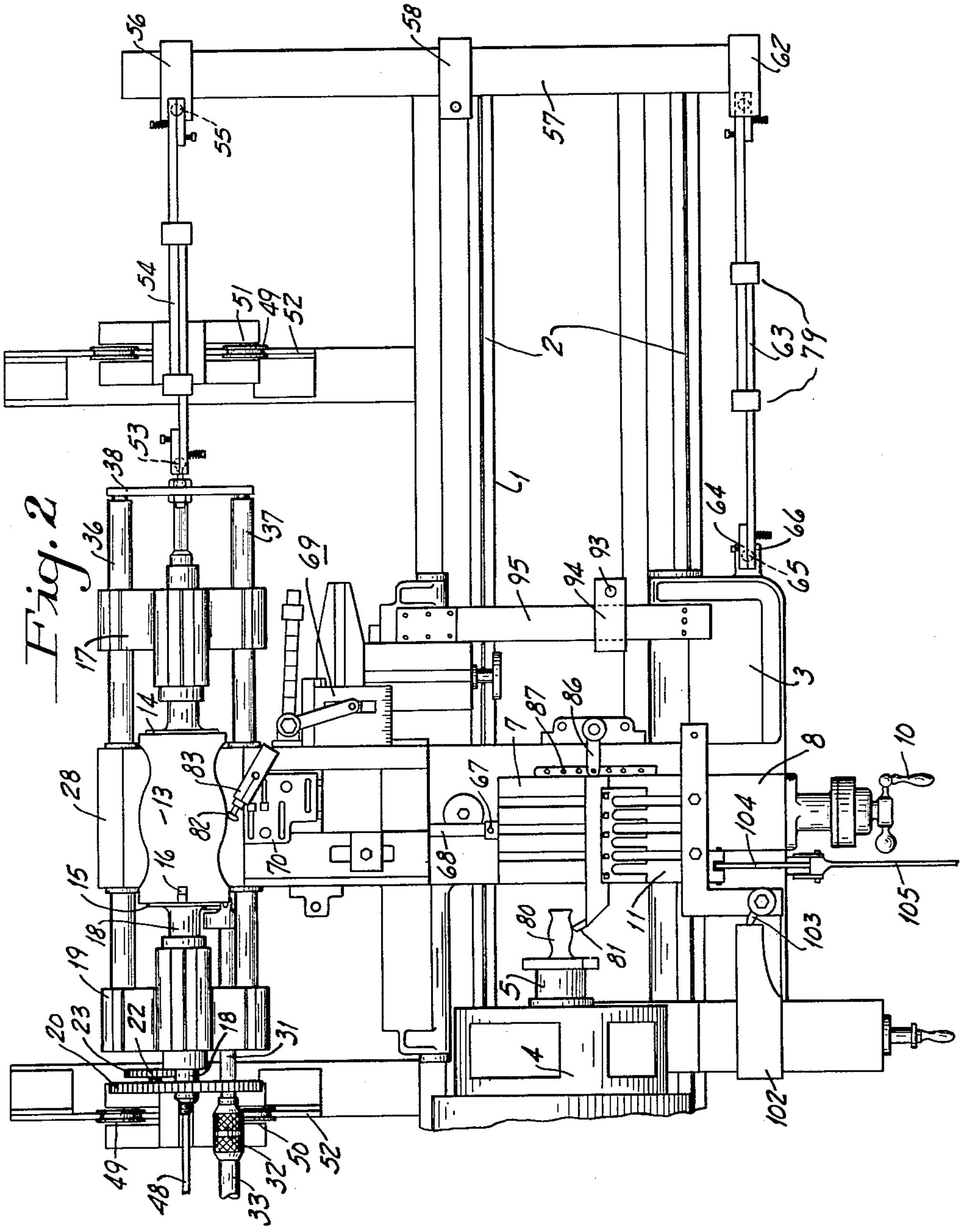
Fig. 2 is a plan view of the reproducing attachment shown in Fig. 1 as employed for producing a recording as a design on the workpiece.
Figure 3:
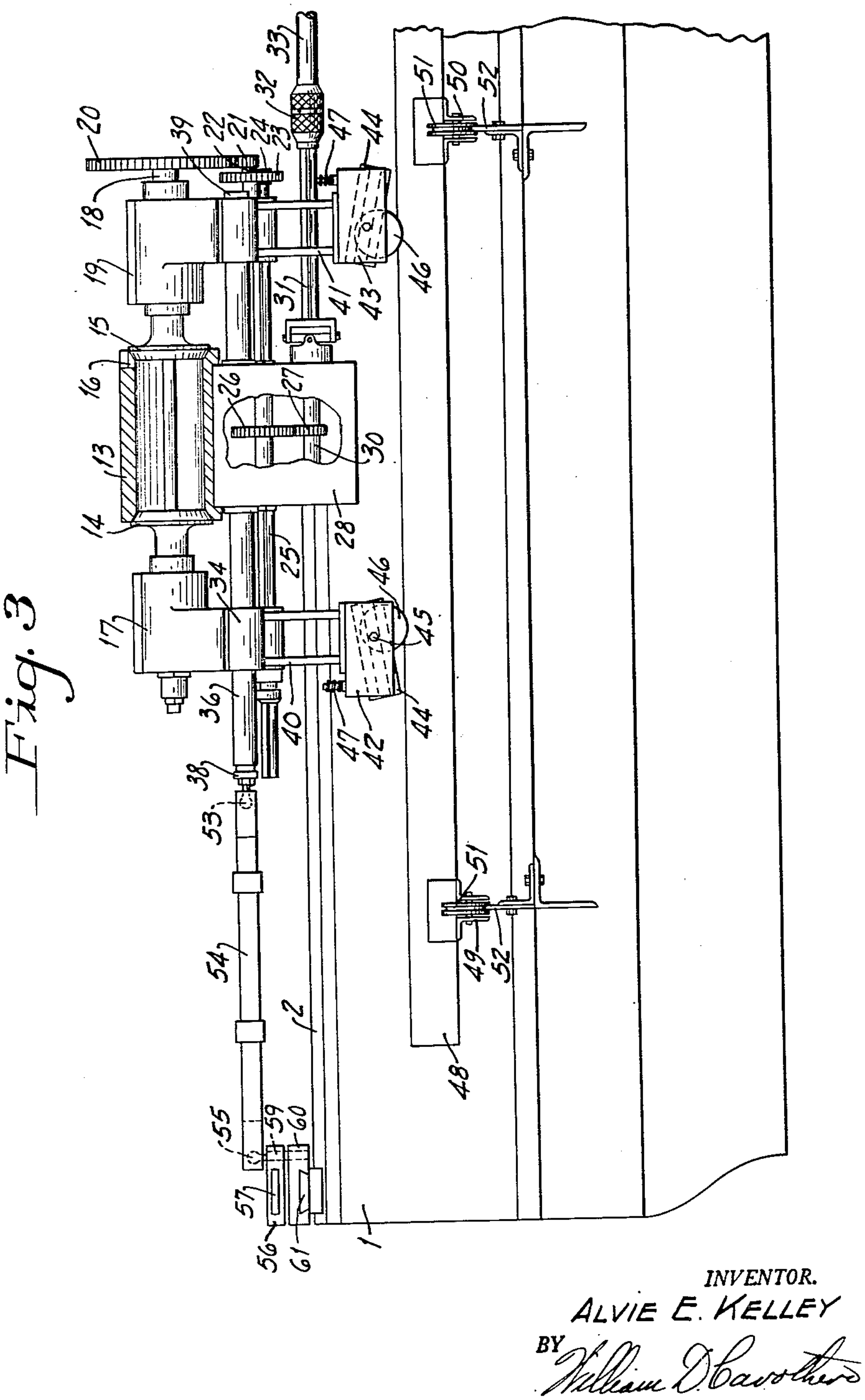
Fig. 3 is a rear view of the record support of the machine with parts of the housing and record being shown in section.

Referring to Figs. 1, 2 and 3, 1 represents the base of the machine tool or lathe which is provided with parallel ways 2 on which the carriage 3 may be made to traverse manually or automatically in either direction between stop limits. The lathe is provided with the chuck head 4 having a chuck 5 holding a model 6 with a design on the cylindrical surface thereof. The carriage 3 is provided with a cross slide mechanism 7 arranged to work on the dovetail way 8 and may be automatically moved in either direction longitudinally of the way 8 and controlled between stop limits or it may be moved manually by means of the ordinary hand screw 10.

A tool holder 11 is mounted on the clamping deck of the cross slide 7 and is shown supporting a pointed follower tool 12 which is arranged to engage the design on the perimetral surface of the model 6.

The record 13, shown in Fig. 1, is cylindrical in shape and is hollow as indicated in Fig. 3 with its bore being beveled at its ends to receive the beveled ends of the plates 14 and 15 for properly centering the record when being mounted in position. The plate 15 is provided with a key 16 that engages the record to prevent relative rotary motion between the plate 15 and the record and to provide a positive drive. The plate 14 is rotatably mounted in a tail stock 17; whereas, the plate 15 is mounted on the record spindle 18 journaled in the head stock 19. The end of the spindle 18 has secured thereto the large gear 20 which in turn meshes with the pinion 21 supported on the shaft 22. The shaft 22 also carries the gear 23 that meshes with the pinion 24 on the intermediate speed shaft 25 that is journaled in the head and tail stocks and is provided with a centrally disposed gear 26 that meshes with the gear 27 enclosed within the housing 28 intermediate the head and tail stocks of the record assembly. The gear 27 is secured to the drive shaft 30 which extends out of the gear box 28 and is provided with a spline connection 31 and the coupling 32 that connects the same to the main drive 33 that extends from the gear mechanism of the lathe 1. Thus, by changing the gears within the lathe 1 the chuck 5 on the lathe spindle may be rotated a predetermined speed relative to the speed of the main drive shaft 33 which in turn rotates the record 13. The tail stock 17 of the record assembly may be moved relative to the head stock 19 to permit the record to be inserted or withdrawn from between the record clamping plates 14 and 15. It will be noted that the tail stock 17 is provided with parallel bearings 34 and 35 for receiving the parallel rods 36 and 37 that are secured at their outer ends to the head stock 19. The tail stock 17 may be adjusted to different positions relative to the head stock 19 to accommodate records of different length.

The rods 36 and 37 are connected at their tail stock end by the cross member 38 to form a carriage for the record assembly, which carriage is supported on the standards 40 and 41 that extend upwardly from the roller housings 42 and 43. Each roller housing is provided with spaced parallel plates between which is mounted a rocking beam 44 pivoted on a pin 45, passing through spaced parallel plates. Each rocking beam 44 is also pivotally connected to the shaft of their respective rollers 46, the shafts of the rollers 46 being spaced inwardly of the pivot pins 45. The outer ends of the rocking beams 43 and 44 are suspended by means of a rod from the springs 47, the tension of which is set to support the weight of the whole of the record assembly independently of the cross slide 7 on the carriage 3 but at substantially the same elevation thereof.

The perimeters of the rollers 46 are grooved and disposed in alignment with each other to permit them to roll over the vertically disposed track member 48 which in turn is supported on the truck members 49 and 50 that are each provided with a pair of grooved rollers 51 arranged to ride on the vertically disposed transverse rails 52 that are fastened to and extend rearwardly from the base of the lathe 1. With this arrangement the whole of the record assembly may be moved parallel with or transversely to the axis of the lathe depending upon the motion transmitted thereto through the carriage 3 or the slide 7.

The cross member 38 of the record assembly carriage is provided with a ball joint 53 arranged to be clamped to one end of the adjustable arm 54. The other end of the adjustable arm 54 likewise engages a ball joint member 55 that is secured to the adjustable slide 56 on one end of the horizontal pantograph beam 57. The horizontal beam 57 is adjustably secured in the pivot clamp 58 which is provided with a depending pivot pin 59 that passes into the adjustable block 60 that is movable on the transverse member 61, that is in turn adjustably mounted on a block secured to the top of the ways 2. The other end of the horizontal beam 57 is provided with a similar adjustable block 62 having a depending ball joint member to which one end of the adjustable arm 63 is secured. The other end of the arm 63 is provided with a socket member 64 for clamping the same to a ball joint member 65 on the plate 66 that is secured to the carriage 3.

The adjustable arms 54 and 63 may be made in any desired length by loosening their spaced clamps 79 which are secured to the adjacent ends of their respective arm sections and are permitted to slide in the opposite arm section thereby enabling one to change their length to any desired position equivalent to substantially once or twice the length of one arm section.

The slides 56 and 62 may be adjustably positioned along the horizontal beam 57 and the latter may be adjusted in the pivot clamp 58 to any desired lever arm position. By these adjustments substantially any desired leverage or mechanical advantage or disadvantage may be produced for the purpose of permitting the carriage 3 to move the record assembly carriage longitudinally of its axis a predetermined distance relative to the movement of the carriage. Thus, the carriage 3 may be connected to a predetermined feed on the lathe in any well known manner for the purpose of moving it along the ways 2. As the carriage 3 moves toward the face of the chuck 5 it will cause, through the pantograph arrangement of the horizontal beam 57, the record assembly carriage to move in the opposite direction a predetermined distance for each increment of distance the carriage traversed. The record carriage assembly is spring biased to draw it toward the head end of the lathe and no lost motion is permitted in the linkage coupling.

The cross slide 7 is provided with a coupling 67 connecting the same to the link 68 that enters the spring biased compensator 69, as shown in Figs. 1 and 2. The compensator 69 is the same as that disclosed in my Letters Patent No. 2,192,267, and a detailed description in this disclosure is therefore not deemed necessary. Any transverse movement of the follower 12 in scanning the surface depth of the design on the model 6 is transmitted through the link 68 and the compensator 69 to the upper or clamping plate 70 of the compensator which in the showing of Fig. 1 is arranged to carry the cutting tool 71, which in this case is a small milling cutter or grinding wheel mounted on the end of the shaft 72 journaled in the block 73 that is mounted on the plate 70. The shaft 72 is provided at its outer end with a pulley 74 which is connected by the belt 75 to the motor 76 that is likewise supported on the plate 70 of the compensator for the purpose of supplying rotary motion to the cutting tool 71. The cutting tool 71 may be a pointed tool instead of the rotary type but in some instances it has been found preferable to employ a rotary cutter for making a recording on a record, particularly when the record is materially larger in diameter than the model from which the design is taken.

Let it be assumed that the design on the model 6, which is mounted in the chuck of the lathe, as shown in Fig. 1, is to be copied from adjacent the face of the chuck outwardly. The follower tool 12 is then positioned in back of the design as shown in Fig. 1 so as to engage the surface of the model on the chuck side of the design. This portion of the surface of the model may be oversize or undersize relative to the design on the model depending upon the character of reproductions to be made from this recording. With the lathe set to rotate the model at a definite speed and to likewise rotate the record 13 at a proportionate speed, owing to its diameter and length, the machine tool is started in motion and the spring biased compensator 69 is arranged to hold the contact scanning tool 12 against the face of the model. The automatic feed of the lathe is then set to cause the carriage 3 to slowly move the cotnact scanning tool 12 outwardly from the face of the chuck 5 thereby causing the contact scanning tool to follow a predetermined helical scanning path across the design on the perimetral surface of the model 6. In view of the fact that the carriage 3 is caused to move outwardly, it in turn causes the record 13 to move in the opposite direction and at a faster rate relative to the carriage 3, thereby commencing the cutting of the recording on the record adjacent its driving end and as the carriage 3 progresses outwardly the record 13 is progressing in the opposite direction relative to the cutting tool 71 which is also provided with lateral movement caused by the depth of irregularities in the design on the model 6. However, the horizontal photograph beam 57 is ordinarily set to cause the record 13 to move at a materially faster rate axially than the axial movement of the contact scanner 12 across the design on the model because of the relative size of the model and the record.

With the motor 76 rotating the cutter tool 71 at a relatively fast rate of speed the spring biased compensator 69 causes the cutter to follow, in greater proportions, the in and out movements of the contact scanner 12 in following the depth of the design. At the same time the carriage is moving outwardly and the record is moving inwardly creating a helical recording on the surface of the record 13, which recording is of course out of proportion to the design on the surface of the model 6. The recording is obviously out of proportion owing to the fact that the record is materially greater in diameter and it is of greater length than the model. Thus, the record must be made to rotate at a faster rate of speed than that of the model but it must be made to rotate in timed relation therewith. With this arrangement a magnified and distorted recording of the design is made on the record, which recording may be touched up if desired to completely eradicate any flaws or inaccuracies that may be produced by the contact follower. However, if the model is accurately made the recording will be just as accurately made as no lost motion is permitted through the linkage of the pantograph or the spring biased compensator.

After a recording of the design has been cut on the record a workpiece such as the hollow glass bottle mold shown in Fig. 2 at 80 may be supported by the chuck 5 and arranged to be engaged by the cutting toool 81; whereas, the record cutting tool 71 has been replaced by a rotary follower 82 which may be a small disk permitted to idle on a shaft, supported by the follower clamp support 83. Owing to the fact that the workpiece 80 may be somewhat larger in diameter than the original model the recording of the design on the record 13 may be reduced in length and reproduced on the workpiece more than once around its circumference as the rotary scanner 82 transverses the revolving record 13 and at the same time the transverse and axial movements of this contact scanning operate the cutting tool 81 as it scans the surface of the revolving workpiece 80 to produce the shape of the article as well as the design. This is possible owing to the fact that three-dimensional movements are employed to make the recording as well as the design.

Figure 4:
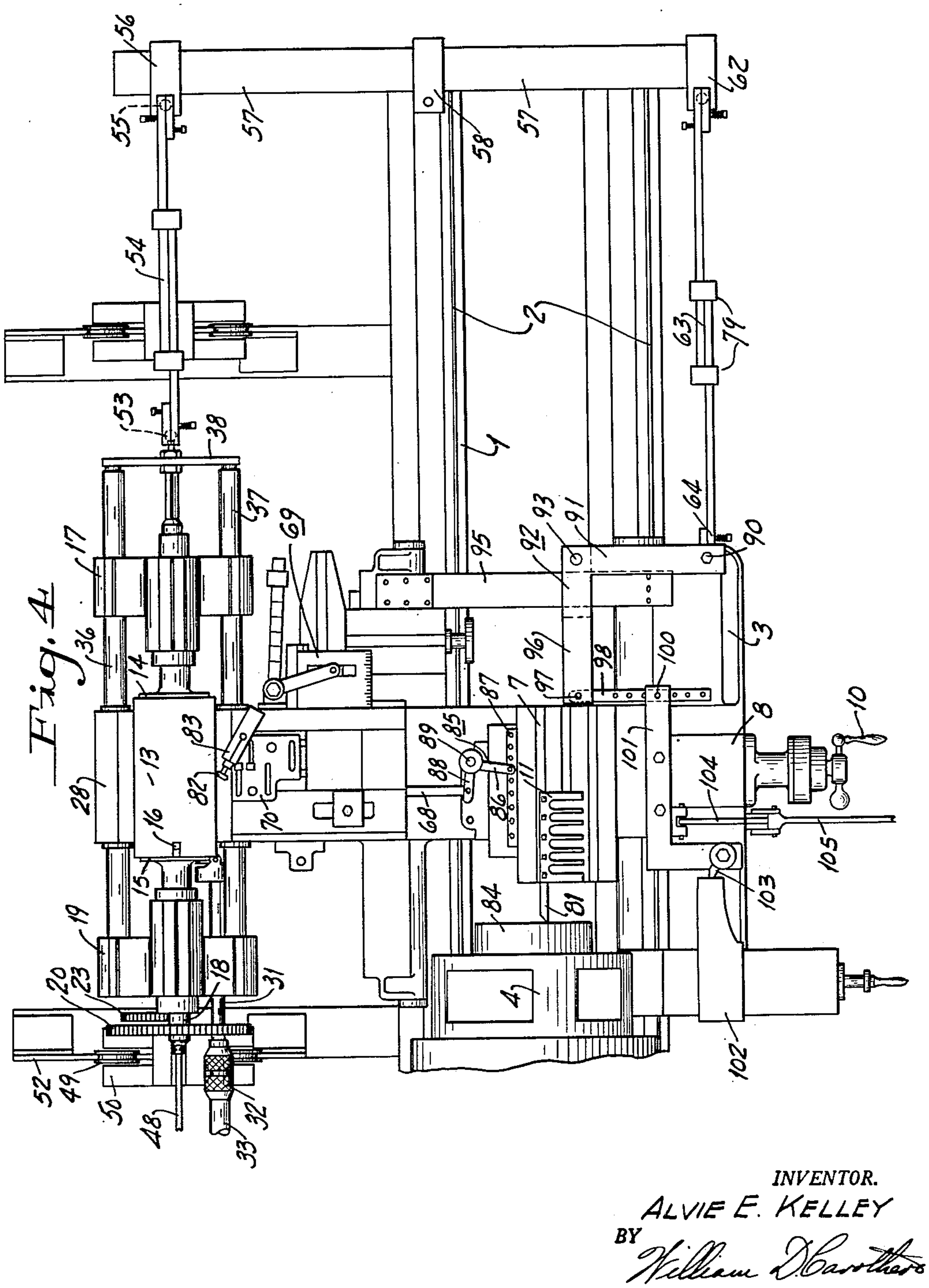
Fig. 4 is a plan view of a lathe with parts broken away and showing the attachment comprising this invention set up to cut a recording on a cylindrical record taken from a design on the transverse surface of a model.

In order to produce a recording of a design transversely of the rotary axis, such as a design for a glass plate mold as shown at 84 mounted in the chuck head 4 in Fig. 4, the clamping table of the cross slide 7 is rotated ninety degrees to that illustrated in Figs. 1 and 2 and the tool holder 11 is provided with a cutting tool 12 arranged to engage the surface of the design from the center of the mold 84 outwardly. In this instance the cross slide 7 moves parallel to the axis of the lathe and is actuated through the bell crank 85, the leg 86 of which is adjustably secured to the cross slide 7 in any one of the holes 87. The other leg 88 of the bell crank is pivotally connected to the end of the link 68 which passes into the spring biased compensator 69. The movable plate 70 on the compensator is provided with the rotary scanning follower 82 mounted in the follower clamp support 83. The contact scanning follower 82 being arranged to engage the recording on the record 13.

The pantograph linkage is connected to the record assembly carriage in the same manner previously described. However, the adjustable arm 63 with its socket 64 is arranged to engage the ball member 90 of the leg 91 of the bell crank lever 92 which is pivoted on the pin 93 supported on the plate 94 that is secured to the table bridging member 95 as shown in Figs. 1 and 2. The other leg 96 of the bell crank lever 92 is pivotally connected at 97 to the link 98 that is adjustably attached by the pin 100 in the bifurcated plate 101 that is in turn secured to the cross slide 7.

When the tool 81 is set in the center of the workpiece 84 and the adjustments are made in the compensator and in the pantograph linkage to reproduce the recording of the record 13 on the face of the workpiece 84 the lathe is started up to rotate both the workpiece and the record 13 and the contact scanning follower 82 is positioned adjacent one end of the recording on the record. The proper selection of the spring biased compensator and the pantograph linkage is also made in accordance with the automatic cross feed of the carriage and the dog for starting the automatic cross feed is tripped to cause the slide 7 to move transversely across the face of the workpiece 84. This movement of the cross slide 7 toward the front of the lathe, or radially outwardly of the workpiece, causes the link 98 to pull on the bell crank 92 rotating it in a counterclockwise direction about the pin 93 thus causing the horizontal beam 57 of the pantograph to likewise move in a counterclockwise direction and force the record 13 to the left in Fig. 4. Thus, the starting point for the contact scanning wheel would be at the left end of the record 13 in Fig. 4. As the contact scanner 82 proceeds to trace a predetermined helical path around the revolving recording of the record 13 it causes the plate 70 of the spring biased compensator to move toward and away from the record in accordance with the depth of the recording, which movement is transmitted through the compensator to the link 68 and the bell crank 85 for the purpose of oscillating the same about the post 89 and causes the clamping plate of the cross slide 7 to move the cutting tool 81 in and out relative to the face of the workpiece 84 for the purpose of cutting the design therein. By properly selecting the rotation of the workpiece and the rotation of the record and by properly proportioning the compensator to regulate the depth of the cut inaugurated by the recording on the record, together with the speed of the movement of the record produced by the cross speed on the lathe, one is enabled to reproduce a design on the transverse face of the workpiece in accordance with the recording on the record. Thus, the recording, which is on a cylindrical surface, is transferred to the workpiece surface.

The distinction between cutting a cylindrical surface illustrated in Fig. 1 and that of a transverse surface as illustrated in Fig. 4 is thus a matter of orientation obtained by employing two bell crank levers and using a different or cross feed on the lathe. In Figs. 1 and 2 the automatic travel feed of the carriage 3 is employed but in Fig. 4 the cross feed of the lathe is employed for producing the travel speed of the record. Thus, the same instrumentalities are employed for making a recording from a model having a design on the cylindrical or transverse surfaces thereof.

As illustrated in Fig. 3 the workpiece 80 has a definite profile or configuration which is produced from a record having a proportional shape. Thus, by means of the spring biased compensator, in combination with the pantograph linkage, a design may be reproduced in a workpiece and at the same time the shape of the workpiece may be given a definite contour. This is particularly advantageous in making the molds for soft drink bottles which may be fluted and which may contain a picture design as well as a name together with letters or numeral characters. The original model may be shaped by hand or modeled so long as this original model contains all of the features of the design that are desired together with the shape of the object the same may be transferred as a recording on the record 13 and any number of workpieces, such as glass molds, may be formed from this record without departing from the accuracy or repetition of the design or shape on the workpiece. The original model may be shaped from a plastic such as glass or molded from a pliable material and have a rigid surface applied thereto permitting the stylus to follow the shape of the model. The forming of a rigid surface on an article is taught in many ways in the prior art. An example is by plating.

It is of course necessary to employ a different record for each shape. Thus, the mold of the hollow glass article has its shape cut within the bore thereof; whereas, the plunger which cooperates with the mold in a glass press machine would have its design formed on the perimetral surface of the workpiece, which becomes the plunger to cooperate with the mold.

Such combined mold and core or plunger members may be reproduced to follow any design for use in die-casting odd shapes even though they may have surfaces which are less than ninety degrees to each other. Such die-cast molds may be employed with aluminum as well as with that which is known as die-cast or white metal.

As shown on Fig. 5 the record 13 is cylindrical in shape and depicts a picture of a girl dancing with a boy. It will be noted that the recording of the girl is distorted in shape. However, when reproduced on a workpiece it will provide the proper proportions of the figure and can be repeated one or more times around the circumference of the workpiece. When a single design, such as the two characters indicated above, is to be made only once on the workpiece the workpiece of course is then larger in diameter and longer than a workpiece on which two or more of these figures are to be formed about the circumference of the workpiece. Thus, it is advantageous to produce a model and make a recording thereof of only one complete character or design which would permit the record to be cut by means of the proper adjustment of the rotary speed of the workpiece and the record, together with the diameters of these members and the speed to which the scanning operation takes place.

A cylindrical record may be employed to produce its recording as a design on a shaped workpiece or the workpiece may be shaped at the time the design is being cut thereon by the use of the profile 102 shown in Fig. 2. This profile is secured to the lathe head and a follower 103 is secured on the cross slide 7. A bell crank lever 104 is pivoted on the carriage 3. Weights are suspended from the long leg 105 of the lever and the short end of the lever is arranged to engage the slide 7 and force it transversely on to the back of the lathe. The follower 103 then engages the profile thus fixing the limit of the cross slide and the cutter tool relative to the workpiece and the compensator continues to oscillate the cutting tool to produce the design from the recording around the shape formed by the profile and the design is then cut simultaneously as the workpiece is being shaped.

In the record shown in Fig. 6 a recording of a soft drink glass bottle has been made on the record which illustrated the flutes. This recording would be used to form the design in the bore of a mold that would be placed on an automatic glass blowing machine wherein the mold halves would be split and arranged to operate in accordance with the teaching of that art. However, with one record many molds can be reproduced with duplicate accuracy which is impossible prior to the teaching of this invention.

It is preferable to employ a material such as cast iron for the records 13 as this material may be easily worked by means of a sharp point cutting tool or by means of a small rotary milling cutter and the recording or surface formed is sufficiently hard to stand repeated contact scanning without injuring the recording. However, steel may be employed where the record is to be used to make hundreds of the same reproductions on different workpieces.

I claim:

1. In a machine tool attachment for reproducing the recording of a design on a master record the combination of means for revolving the master record and a workpiece in timed relation with each other, a compensator, a contact scanning member carried by the compensator and positioned to engage the recording on the revolving surface of the record, a cutting tool operated by the scanning movement of the compensator to produce the design on the workpiece, and pantograph means connected between the cutting tool and the record for moving them in timed relation to each other to progressively contact scan the record and accurately reproduce the recording as a design on the workpiece.

2. The structure of claim 1 characterized in that the revolving record is provided with a mounting for movement transversely of its axis and with the compensator as a unit but independently of the progressive scanning movement which is axially of the record.

3. The structure of claim 1 characterized in that said pantograph consists of a series of connected link and lever arm means capable of adjustment to change the relative dimension of the design and the recording on the record.

4. An apparatus for reproducing a three-dimensional design and the contour of one object on a second object comprising, a rotary chuck for each object to support the same for rotation, a rotary drive, a driving connection between the rotary drive and each chuck to rotate both objects at selected peripheral speeds in timed relation to each other, a follower tool mounted to engage the revolving surface of the first object, a cutting tool mounted to engage and cut the revolving surface of the second object, a compensation means connecting and transmitting proportional movements of the follower to the cutting tool as the respective surfaces of the objects rotate, a second compensator means connecting one of said objects with the tool operating on the other object and transmitting proportional relative movement between both tools and their respective objects progressively along the surfaces of the objects to effect a proportional reproduction of the three-dimensional design and contour of the first object to the second object, and a third driving connection between the rotary drive and said second compensator to operate the latter.

5. An apparatus for reproducing a design on a master record comprising a rotary chuck for supporting a model having the design thereon, a rotary chuck for supporting a master record, drive means to rotate both chucks at selected rotary speeds in timed relation to each other, a stylus mounted on a carriage biased to engage the surface of the design on the model, a tool mounted to cut a design on the master record, means to transmit said biased movement of the stylus to the mounting of the tool, means to move the carriage and the stylus thereon longitudinally of the model, and beam means connecting between the carriage and master chuck to move the latter longitudinally to scan it in a helical path and permit the tool to cut the master record.

6. The structure of claim 5 characterized in that said beam means has an intermediate pivot permitting the carriage to move in one direction and the master record in an opposite direction.

7. The structure of claim 5 characterized in that the rotary speeds of the model and master record chucks are different.

8. The structure of claim 5 characterized in that the beam is pivoted to make the speed of movement of the carriage different than the longitudinal movement of the master chuck.

9. An apparatus for reproducing a design on a master record comprising a rotary chuck for supporting a model having a design on a face transverse to its rotary axis, a rotary chuck for supporting a master record, drive means to rotate both chucks at selected rotary speeds in timed relation to each other, a stylus mounted on a carriage biased to engage the surface of the design on the model, a tool mounted to cut a design on the master record, means to feed the stylus across the face of the rotating design in a spiral path to scan the same, means to transmit said biased movement of the stylus in scanning the design to the mounting of the tool, and means to move the master record chuck longitudinally of its axis in timed relation with the transverse movement of the stylus to permit the tool to cut the design on the cylindrical surface of the record.

10. An apparatus for reproducing a design on a master record comprising a rotary chuck for supporting a model having a design thereon, a rotary chuck for supporting a master record materially larger than said model, drive means to rotate both chucks at selected rotary speeds in timed relation to each other, a stylus mounted on a carriage biased to engage the surface of the design of the model, a tool mounted to cut a design on the master record, means to transmit said biased movement of the stylus to the mounting of the tool, means to feed the carriage and the stylus across the design on the model as it is rotated, and means operated in timed relation with the last mentioned means to move the master record longitudinally and in timed relation to the feed of the carriage to cut a large design on the record from a small design on the model.

11. An apparatus for reproducing a single design on a worpiece from a master record comprising a rotary chuck for supporting a master record having a design thereon, a rotary chuck for supporting a workpiece, drive means to rotate both chucks at selected rotary speeds in timed relation to each other, a follower mounted on a carriage biased to engage the design of the master record, a tool mounted to cut a design on the workpiece, means to transmit said biased movement of the follower to the mounting of the tool, means to feed the rotating master record longitudinally to scan the design by the follower, means to move the tool mounting across the rotating workpiece in timed relation to the longitudinal movement of the master record to cut the design on the workpiece, and means to adjust said rotary speeds and movements to reproduce the single design a plurality of times on the surface of the workpiece.

References Cited in the file of this patent

UNITED STATES PATENTS

| | | |
|---|---|---|
| 402,135 | Bradley | Apr. 30, 1889 |
| 479,364 | Hertel | July 19, 1892 |
| 1,234,225 | Sickles | July 24, 1917 |
| 1,419,851 | Head | June 13, 1922 |
| 2,140,949 | Bickel | Dec. 20, 1938 |
| 2,192,267 | Kelley | Mar. 5, 1940 |
| 2,225,409 | Bromley | Dec. 17, 1940 |
| 2,330,566 | Edmonds | Sept. 28, 1943 |
| 2,375,831 | Turchan | May 15, 1945 |
| 2,434,834 | Civitarese | Jan. 20, 1948 |